(12) United States Patent
Hellmig et al.

(10) Patent No.: US 11,181,139 B2
(45) Date of Patent: Nov. 23, 2021

(54) SECURING ELEMENT

(71) Applicant: EJOT GmbH & Co. KG, Bad Berleburg (DE)

(72) Inventors: Ralph J. Hellmig, Bad Laasphe (DE); Wilfried Pinzl, Tambach-Dietharz (DE); Ilir Selimi, Biedenkopf (DE); Gerd Weigel, Eschenburg (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 179 days.

(21) Appl. No.: 16/069,417

(22) PCT Filed: Jan. 12, 2017

(86) PCT No.: PCT/EP2017/050556
§ 371 (c)(1),
(2) Date: Jul. 11, 2018

(87) PCT Pub. No.: WO2017/121793
PCT Pub. Date: Jul. 20, 2017

(65) Prior Publication Data
US 2019/0032699 A1      Jan. 31, 2019

(30) Foreign Application Priority Data
Jan. 12, 2016   (DE) .................. 10 2016 100 446.4

(51) Int. Cl.
*F16B 39/282*      (2006.01)

(52) U.S. Cl.
CPC .................... *F16B 39/282* (2013.01)

(58) Field of Classification Search
CPC ..................................................... F16B 39/282
(Continued)

(56) References Cited

U.S. PATENT DOCUMENTS

| 83,214 | A | * | 10/1868 | Sanders | ............... | F16B 39/282 |
| | | | | | | 411/188 |
| 308,562 | A | * | 11/1884 | Jordan | ............... | F16B 39/282 |
| | | | | | | 411/161 |

(Continued)

FOREIGN PATENT DOCUMENTS

| CN | 202132362 U | 2/2012 |
| CN | 103249956 A | 8/2013 |

(Continued)

OTHER PUBLICATIONS

International Search Report issued in PCT/EP2017/050556 (PCT/ISA/210), dated Apr. 6, 2017.

(Continued)

*Primary Examiner* — Flemming Saether
(74) *Attorney, Agent, or Firm* — Birch, Stewart, Kolasch & Birch, LLP

(57) ABSTRACT

A securing element includes a threaded region, wherein a securing rotational direction and an axial clamping direction are defined by the thread design. The securing element has a head with a head lower face which faces the clamping direction and via which a force-fitting connection with a component can be produced. The head is designed such that the head lower face has an edge region at a radial distance from the head center, and the contour of the head lower face runs opposite the clamping direction in the direction of the head center starting from the edge region, whereby a spring effect can be produced. The edge region has a changing circumferential level in the axial direction. Opposite the securing rotational direction, the circumferential level rises at a rising angle of maximally 15° in the clamping direction over a central angle of at least 65°.

20 Claims, 4 Drawing Sheets

(58) Field of Classification Search
USPC .................................................. 411/184–189
See application file for complete search history.

(56) References Cited

U.S. PATENT DOCUMENTS

| | | | | |
|---|---|---|---|---|
| 1,208,997 | A * | 12/1916 | McGuigan | F16B 39/282 411/188 |
| 1,923,647 | A * | 8/1933 | Vera | F16B 39/24 411/188 |
| 1,956,745 | A * | 5/1934 | Payne | F16B 39/26 411/186 |
| 3,078,899 | A * | 2/1963 | Kuffel | F16B 39/282 411/185 |
| 3,221,792 | A | 12/1965 | Poupitch | |
| 4,220,188 | A * | 9/1980 | McMurray | F16B 39/282 411/188 |
| 4,293,256 | A | 10/1981 | Pamer | |
| 4,812,095 | A | 3/1989 | Piacenti et al. | |
| 5,183,359 | A * | 2/1993 | Barth | F16B 39/282 411/161 |
| 5,190,423 | A | 3/1993 | Ewing | |
| 5,456,719 | A * | 10/1995 | Keller | A61F 2/30721 623/11.11 |
| 6,776,565 | B2 | 8/2004 | Chang | |
| 7,014,406 | B2 * | 3/2006 | Robertson | F16B 35/065 411/161 |
| 9,109,619 | B2 | 8/2015 | Pinzl et al. | |
| 2010/0303580 | A1 | 12/2010 | Lin | |
| 2013/0251476 | A1 | 9/2013 | Pinzl et al. | |

FOREIGN PATENT DOCUMENTS

| | | |
|---|---|---|
| CN | 103836050 A | 6/2014 |
| CN | 204025277 U | 12/2014 |
| CN | 204403105 U | 6/2015 |
| CN | ON 204784060 U | 11/2015 |
| DE | 2 306 087 | 8/1974 |
| EP | 0 028 746 A1 | 5/1981 |
| JP | 2011-34707 A | 2/2011 |
| RU | 2155886 C2 | 9/2000 |
| WO | WO 2012/076360 A1 | 6/2012 |

OTHER PUBLICATIONS

International Preliminary Report on Patentability and English translation of the Written Opinion of the International Searching Authority (forms PCT/IB/373, PCT/ISA/237 and PCT/IB/338), dated Jul. 26, 2018, for International Application No. PCT/EP2017/050556.
Chinese Office Action and Search Report dated Jun. 9, 2020 for Application No. 201780016057.2, along with an English translation.

* cited by examiner

SECURING ELEMENT

BACKGROUND OF THE INVENTION

1. Field of the Invention

The invention relates to a securing element according to the preamble of claim 1.

2. Description of Background Art

In a known manner, the screw comprises a threaded shank and a head, with the design of the thread defining a screwing-in direction and the head, at its end facing the shank, furthermore having a diameter which is larger than the diameter of the shank, and with the head being designed such that, in an axial direction towards the shank, the edge region of the head is spaced from its connection region on the shank, thus allowing a preload to be generated. This type of a screw is also referred to as a spring-head screw.

A generic screw is disclosed in WO 2012/076360 A1 that has an undulating flange in its edge region. Due to the conical shape of the head, a preload can be generated on a component, which preload is generated by urging the undulation into a flattened configuration against the component.

With this type of spring-head screw, there is a likelihood of the screw becoming loose, in particular in case of high dynamic loads.

A generic spring-head screw according to EP 0 028 746 A1 can be used as a screw that is capable of indicating the applied contact force. This disclosure relates to a screw which has a flat annular bottom surface and which has spring sections in sectors. The spring section has a circumferential undulating edge section. This edge section is coaxially offset from the shank and radially offset from the connection area. The undulating edge section is flattened as the screw is tightened, thus indicating that the maximum tightening torque has been applied. Should the screw become loose in the course of time, this will be indicated by the reappearance of the undulation in its edge section.

This allows any loosening of the screw to be detected at an early stage.

SUMMARY OF THE INVENTION

It is an object of the invention to increase the release torque of a spring-head screw and to improve its dynamic properties.

This object is achieved by the characterizing features of claim 1 in conjunction with the features specified in its preamble.

The dependent claims provide advantageous embodiments of the invention.

In a known manner, the securing element comprises a threaded portion, with the design of said thread defining a rotational fastening direction and an axial clamping direction. Furthermore, the securing element has a head whose underside faces the clamping direction, which underside can be used to produce a force-fitting connection with a component. The head is designed such that an edge region of the head underside is radially spaced from the center of the head, and the contour of the head underside, starting from the edge region towards the center of the head, furthermore extends in a direction opposite to the clamping direction, whereby a spring effect can be produced. Moreover, in the axial direction, the edge region also has a varying circumferential level.

According to the invention, in a direction opposite to the rotational fastening direction, the circumferential level increases over a central angle ($\beta$) of at least 65° with a maximum pitch angle ($\alpha$) of 15° in the clamping direction. After reaching an apex, the circumferential level decreases again against the clamping direction.

As the head increasingly presses down on the component to be clamped, also the central region of the head underside is urged into contact with the component to be clamped. The spring head is tightened to produce a preload in the elastic region of the head.

The slight rise in the height level thus guarantees a low-friction fastening operation, which will also prevent damage to the surface of a component to be clamped. This is especially advantageous in the case of coated materials. Moreover, most of the torque used for the screw connection can also be used for applying a preload on the component to be clamped so that there is no need to convert it into frictional energy.

Preferably, the rise is monotonic, in particular strictly monotonic. This will ensure that the spring head is pressed continuously against a component.

According to yet another advantageous embodiment, the level rises over a sector central angle of at least 70°. Preferably, the level rises at a pitch angle of 10° at the most, in particular of 5° at the most. This allows the contact pressure to be increased in a gentle manner so as to prevent damage to the surface of a component.

Consistently, after each rise, the level immediately drops again following a rise. This preferably occurs at an angle of descent ($\delta$) of more than 45°, in particular of more than 65°, but in particular at an angle of less than or equal to 90° relative to a plane normal to the screw axis. As a result, a sharp edge is produced which serves to secure the screw against unscrewing without requiring an undercut. This makes the securing element easy to manufacture.

It can further be provided that the height level descends over a sector central angle of 15° at the most.

Owing to the very flat rise and the steep descent of levels, a preload can be applied gently without damaging the surface of a component, and this will also secure the securing element against unscrewing.

A rising section with a subsequent descent creates a cam. According to the invention, any number of cams between one and five can be formed on the underside of the screw head. For a rising section, its sector central angle is preferably in a range of between 345° and approximately 360°. If there are three rising sections, the sector central angle can range between 105° and approximately 120°.

For the formation of a cam, the rise width An and the descent width Ab at the same radial distance from the central axis, as seen in a flat-pattern view the surface is unwind, satisfy the relationship $Ab(\gamma)*\tan(\delta)=An(\beta)*\sin(\alpha)$.

The securing element may preferably be formed as a screw. As is well known, in this embodiment, the threaded shank of the screw connects to the underside of the screw head coaxially to the latter. In particular, the head has drive contours which are preferably arranged on the head top opposite the head underside.

In another embodiment, the securing element may also be formed as a nut, and in this embodiment, an internal thread is arranged concentrically in the screw head and the drive is in particular formed laterally. Further advantages, features and possible applications of the present invention will become apparent from the following description in which reference is made to the embodiments illustrated in the drawings.

BRIEF DESCRIPTION OF THE DRAWINGS

In the drawings:

FIG. 6b is a lateral view of the head of FIG. 6a.

DETAILED DESCRIPTION OF THE PREFERRED EMBODIMENTS

Figure 1:
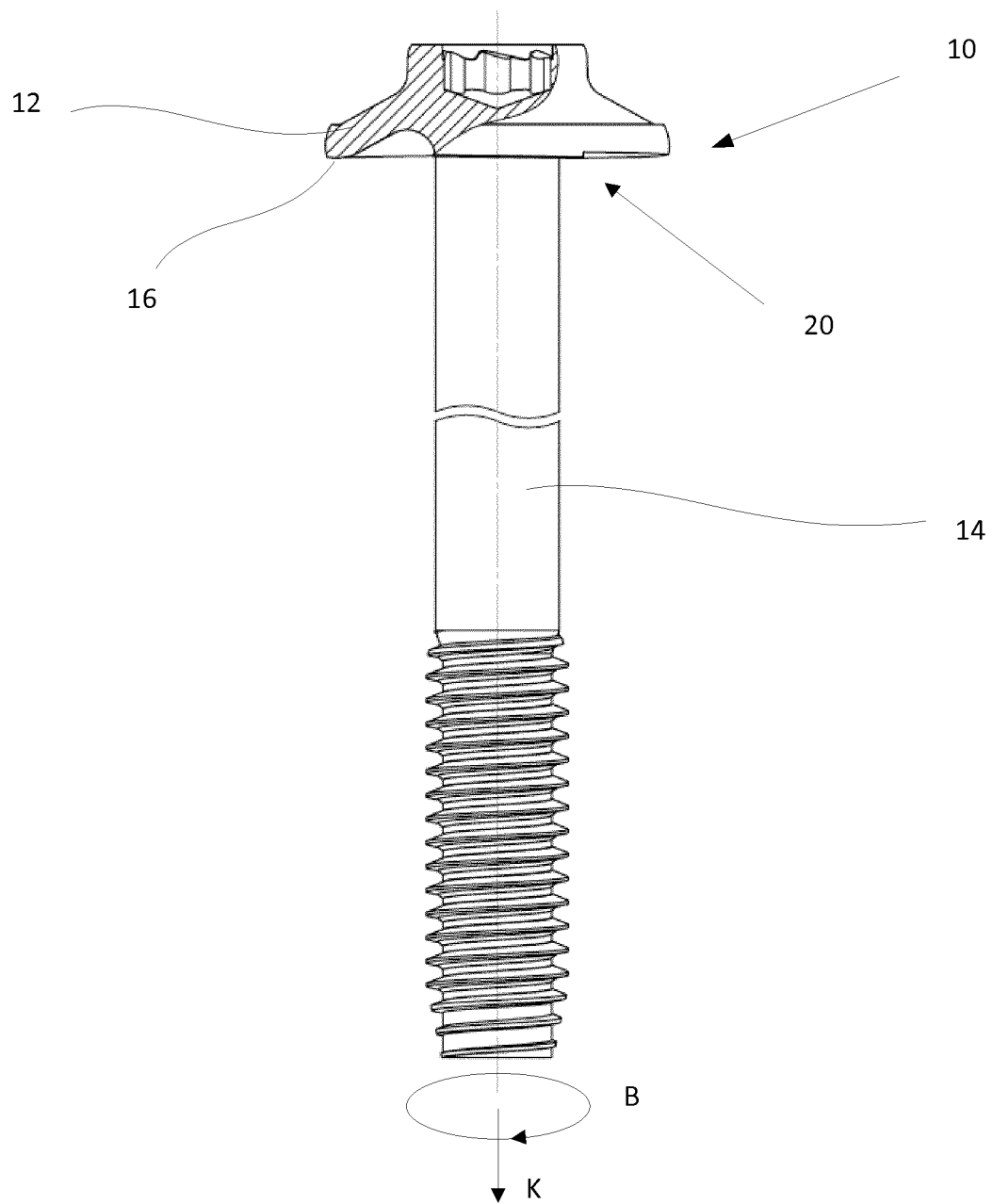
FIG. 1 is a partial sectional view of a securing element (screw) having a retaining structure.

FIG. 1 is a partial sectional view of a securing element according to the invention in the form of a screw 10 having a head 12. The head 12 transitions into a threaded shank 14. The thread defines a rotational fastening direction B and a clamping direction K. Radially spaced from the center of the head, the head 12 has an edge region 16 which is brought into contact with a component to be clamped. As illustrated, on the head underside, the contour of the head, starting from the edge region 16, extends against the clamping direction K. This design yields a spring effect of the edge region 16 relative to the center of the head. The edge region 16 changes in height level in the axial direction (which will be described in more detail in the following figures), with a rise in the clamping direction K extending over a sector central angle ß of 358°. The rise extends at an angle of less than 2°, which ensures that the head 12 will be pressed onto the component to be clamped (not shown) in a very gentle manner. Following the rising region, the height level drops again to the original starting level over a sector central angle γ of 2° in a transition region 20, against the clamping direction K. This steep drop secures the screw against unscrewing against the rotational fastening direction B. The slight rise in height level in the edge region prevents unscrewing and is easy on the surface of a component to be clamped.

Figure 2:
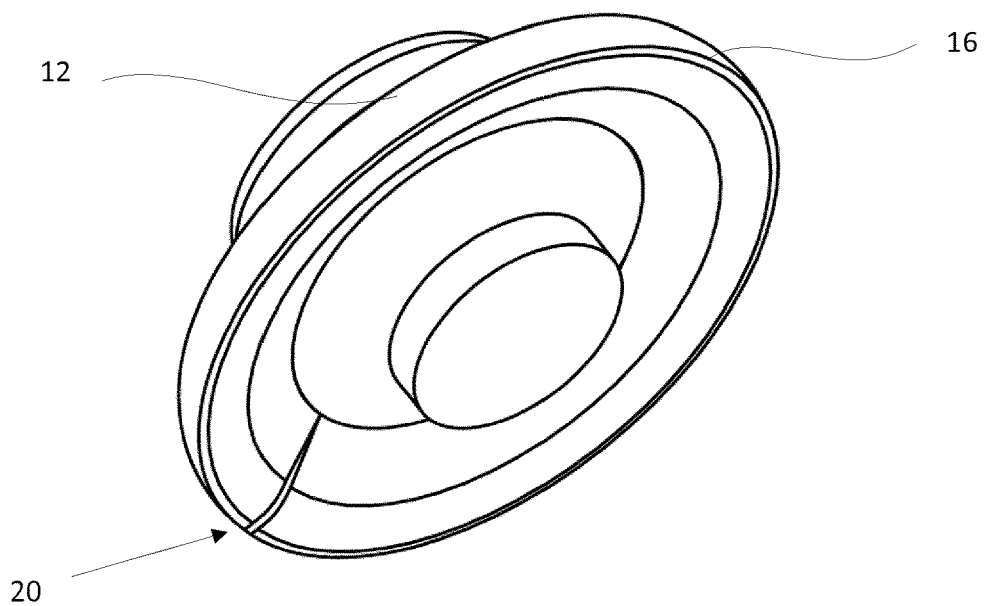
FIG. 2 is a perspective view of a securing element head, according to the invention, of a securing element having a retaining structure.

FIG. 2 is a perspective view of the head 12 showing the head underside of a securing element according to the invention, similar to the view of FIG. 1. This view clearly shows the edge region 16 and the transition region 20 and the hat-like contour of the head.

Figure 3:
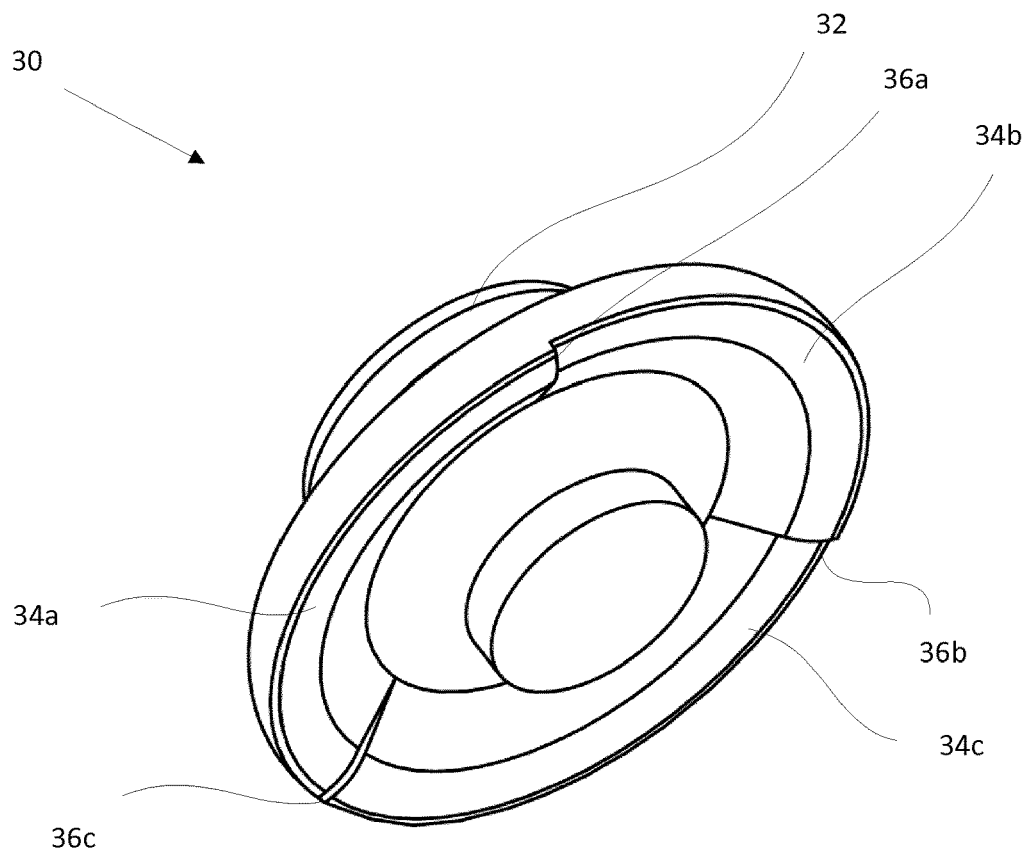
FIG. 3 is a perspective view of a securing element head, according to the invention, of a securing element having three retaining structures.

FIG. 3 is a perspective view of a head 32 of a securing element 30 according to the invention with a right-hand thread. For reasons of clarity, the shank is not shown in this view. A corresponding securing element 30 is designed in the form of a securing element 30 having a head 32. The embodiment shown in FIG. 3 has three rising sections 34a, 34b, 34c over a sector central angle ß of 118°, with the descent extending over a sector central angle of 2°. These three sections enable the head 32 to exert a more uniform contact pressure on the component to be clamped (not shown). In addition, the larger number of retaining structures 36a, 36b, 36c resulting from the steep drop as compared to the embodiment of FIG. 1 results in an increased release torque of the screw, with stress being more uniformly distributed in the head 32.

Figure 4:
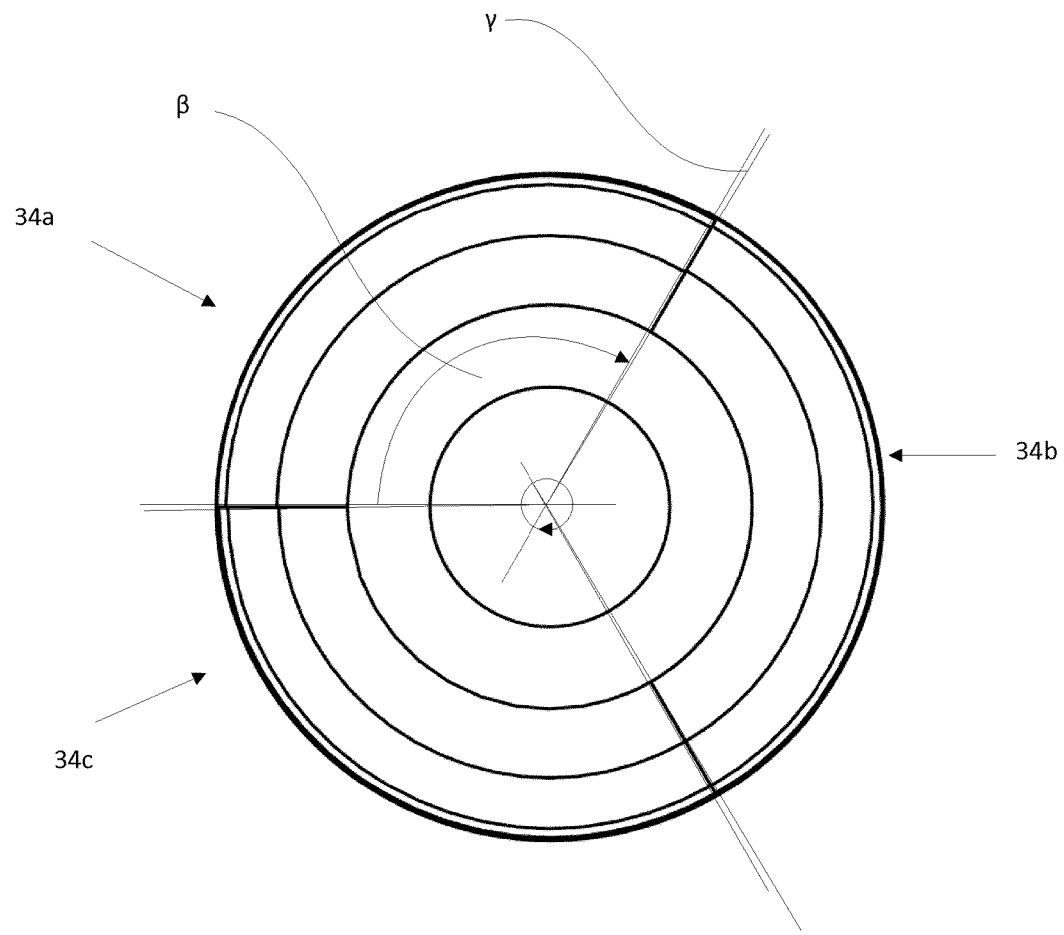
FIG. 4 is a plan view of the head underside of the screw head of FIG. 3.

FIG. 4 is a plan view of the head underside of the head 32 of FIG. 3. The three rising sections 34a, 34b, 34c each extend over a sector central angle ß of 118°, with the retaining structures being provided by a height level drop to the starting level of approx. γ=2°.

Figure 5:
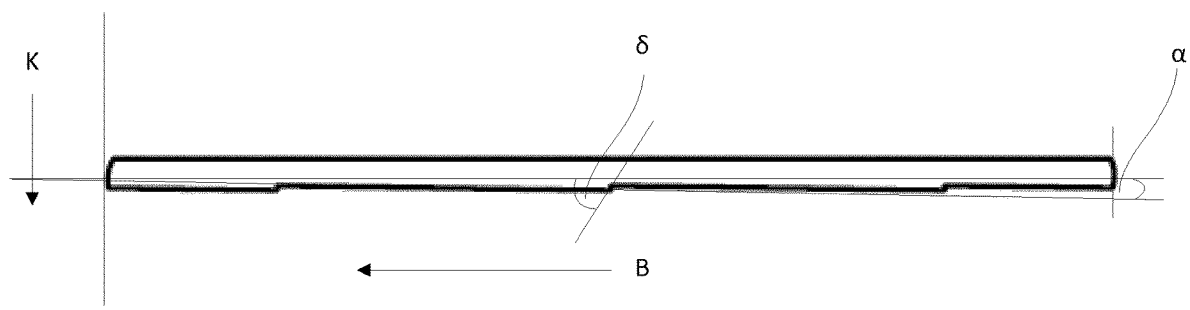
FIG. 5 is a flat-pattern view of the edge region of the head of FIG. 3.

FIG. 5 is a flat-pattern view of the edge region of the head 32 of FIG. 3 which more clearly illustrates the course of the height level of the edge region. This drawing shows the height level in the direction K against the rotational fastening direction B over the sector central angle R. As can be gathered from this illustration, the height level rises in the clamping direction over 118° with an upward slope of about 1° and then drops over a range of 2° back to the starting level from where it rises again in the further course. This creates the retaining structures already described with reference to FIG. 3 which guarantee an effective increase of the release torque with clamping properties that will not damage the surface.

Figure 6A:
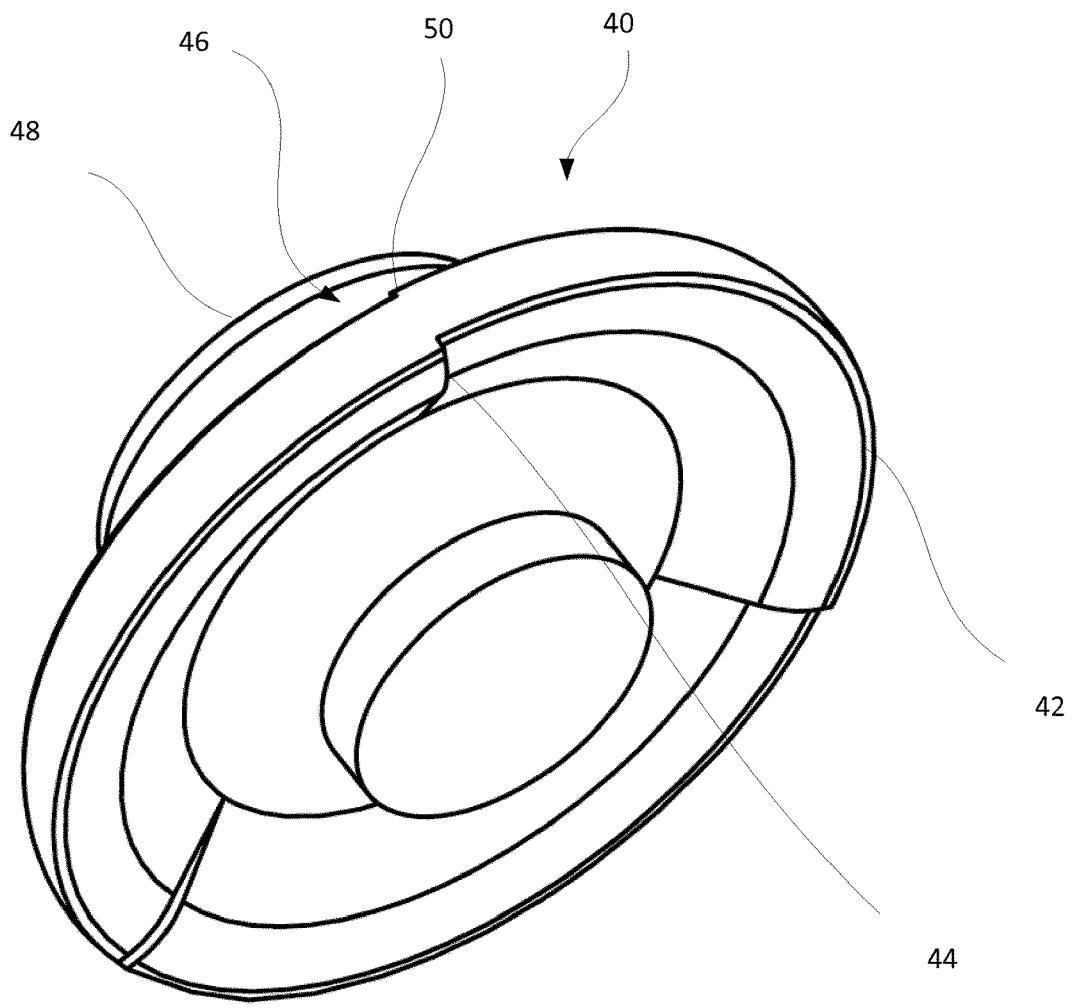
FIG. 6a is a perspective view of a securing element head, according to the invention, of a securing element having three retaining structures with an offset.

FIG. 6a is a lateral view of a head 48 of another embodiment of a securing element 40 according to the invention with a right-hand thread. For reasons of clarity, the screw shank has been omitted from this view. In this embodiment, the level change of the edge section 42 on the head underside 44 is analogously present on the head top 46. The offset 50 results in a uniform thickness of the head in its edge region 42, which ensures uniform stress distribution in the head as the securing element 40 is being tensioned, at the same time retaining the volume displaced during forming in the manufacturing process.

Figure 6B:
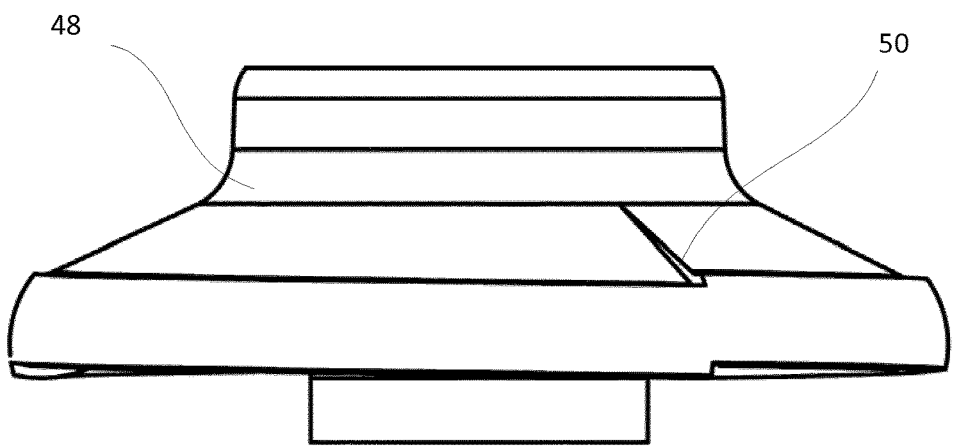

FIG. 6b is a lateral view of the head 48 of FIG. 6a which clearly shows the course of the offset 50.

The invention claimed is:

1. A securing element comprising:
   a threaded portion, wherein a rotational fastening direction and an axial clamping direction are defined by the thread design; and
   a head having a central region and a flange extending from the central region to form a monolithic edge region at a radial distance from the center region, the flange being narrower in the axial clamping direction than the central region, said edge region of the flange having an underside which faces the clamping direction and via which a force-fitting connection with a component can be produced,
   wherein the underside of the edge region of the flange has a changing surface level in the axial direction,
   wherein opposite the rotational fastening direction, the surface level rises at a pitch angle of maximally 15° in the clamping direction over an angle of at least 65°, and
   wherein an offset in an upper surface of the edge region of the flange has a changing surface level in the axial direction to provide uniform thickness of the head in the axial direction.

2. The securing element according to claim 1, wherein the rise of the surface level is monotonic.

3. The securing element according to claim 2, wherein the rise extends over an angle of at least 70°.

4. The securing element according to claim 2, wherein the rise extends at a pitch angle of 10° at the most.

5. The securing element according to claim 2, wherein a descent following the rise is at an angle of descent of more than 45°, but <=90° with respect to a plane normal to the screw axis.

6. The securing element according to claim 1, wherein the rise of the surface level extends over an angle of at least 70°.

7. The securing element according to claim 6, wherein the rise extends at a pitch angle of 10° at the most.

8. The securing element according to claim 6, wherein a descent following the rise is at an angle of descent of more than 45°, but <=90° with respect to a plane normal to the screw axis.

9. The securing element according to claim 1, wherein the rise of the surface level extends at a pitch angle of 10° at the most.

10. The securing element according to claim 1, wherein a descent of the surface level following the rise of the surface level is at an angle of descent of more than 45°, but <=90° with respect to a plane normal to a screw axis.

11. The securing element according to claim 1, wherein a descent of the surface level extends over an angle range of 15° at the most.

12. The securing element according to claim 1, wherein the rise width of the surface level An and a descent width of the surface level Ab at a same radial distance from a screw axis satisfy the relationship $Ab*\tan(\delta)=An*\sin(\alpha)$.

13. The securing element according to claim 1,
wherein the securing element is a screw which has a shank that is threaded and arranged in the center of the head and extends in the clamping direction.

14. The securing element according to claim 1, wherein the securing element is a nut in which the thread is arranged in a center of a head thereof.

15. The securing element according to claim 1, wherein the rise extends at a pitch angle of 5° at the most.

16. The securing element according to claim 1, wherein a descent following the rise is at an angle of descent of more than 65°, but <=90° with respect to a plane normal to the screw axis.

17. The securing element according to claim 1, wherein the surface level continuously increases in the axial direction around a circumference of the head.

18. The securing element according to claim 1, wherein the changing surface level has three rising sections, each extending 118°, and three descending sections, each extending 2°.

19. A securing element comprising:
a threaded portion, wherein a rotational fastening direction and an axial clamping direction are defined by the thread design; and
a head having a central region and a flange extending from the central region to form an edge region at a radial distance from the center region, the flange being narrower in the axial clamping direction than the central region, said edge region of the flange having an underside which faces the clamping direction and via which a force-fitting connection with a component can be produced,
wherein the underside of the edge region of the flange has a changing surface level in the axial direction, and
wherein opposite the rotational fastening direction, the surface level increases at a pitch angle of maximally 15° in the clamping direction over greater than 180°.

20. The securing element according to claim 19, wherein the surface level continuously increases in the axial direction around a circumference of the head.

* * * * *